Nov. 19, 1968  B. F. ERLANGER  3,412,150

Nα-BENZOYL ARGININE P-NITROANILIDE HYDROCHLORIDE

Filed Jan. 15, 1965

INVENTOR.
BERNARD F. ERLANGER
BY
Edward F. Costigan
Louis B. Applebaum
ATTORNEYS

United States Patent Office 3,412,150
Patented Nov. 19, 1968

3,412,150
Nα-BENZOYL ARGININE P-NITROANILIDE HYDROCHLORIDE
Bernard F. Erlanger, Beechhurst, N.Y., assignor to the United States of America as represented by the Secretary of the Navy
Continuation-in-part of application Ser. No. 231,605, Oct. 18, 1962. This application Jan. 15, 1965, Ser. No. 425,979
1 Claim. (Cl. 260—558)

ABSTRACT OF THE DISCLOSURE

The compound Nα-benzoyl arginine p-nitroanilide hydrochloride is useful in facilitating the study of enzymes, particularly in providing a colored product which is released as a direct result of enzyme activity. It is synthesized by adding p-nitroaniline and tri-n-butylamine to a solution containing Nα-benzoyl L-arginine, diethyl phosphate and phosphoric acid. The mixture then is poured into a solution of phosphorus pentoxide in diethyl phosphite, with the diethyl phosphite later removed before adding the residual oil to N HCl. Crystalline D, L, and DL isomers of benzoyl arginine p-nitroanilide hydrochloride are recovered in a yield of substantially 74%.

This application is a continuation-in-part of my co-pending application Ser. No. 231,605 filed Oct. 18, 1962 for benzoyl arginine p-nitroanilide hydrochloride, now abandoned.

This invention relates to a new chromogenic material for use with enzymes and particularly to Nα-benzoyl arginine p-nitroanilide hydrochloride.

The task of assaying enzymic activity has been simplified appreciably by the use of chromogenic substrates. For example, studies on the reactivation of enzymes are facilitated by the availability of substrates, the hydrolysis of which can be followed colorimetrically by subsequent coupling reactions with organic dye-like salts. In many cases, however, what is needed is a direct chromogenic substrate, one that would release a colored product as a direct result of enzyme activity rather than one requiring a subsequent coupling reaction to indicate the extent of hydrolysis. For instance, in the case of the enzyme trypsin, there are few, if any, chromogenic substrates readily available.

I have now discovered a chemical, Nα-benzoyl arginine p-nitroanilide hydrochloride, which upon tryptic hydrolysis, will release a colored product but which will not hydrolyze appreciably in the absence of enzyme. However, tryptic hydrolysis of this substrate produces p-nitroaniline which is yellow and, as a result, the presence, degree of activity, and assay of this enzyme can be estimated colorimetrically.

An object of this invention is to provide a new chromogenic material for use in determining the presence, degree of activity and assay of trypsin and trypsin-like enzymes in biological systems.

Other objects and many of the attendant advantages of this invention will be readily appreciated as the same become better understood by reference to the following detailed description and drawings wherein.

Figure 1:
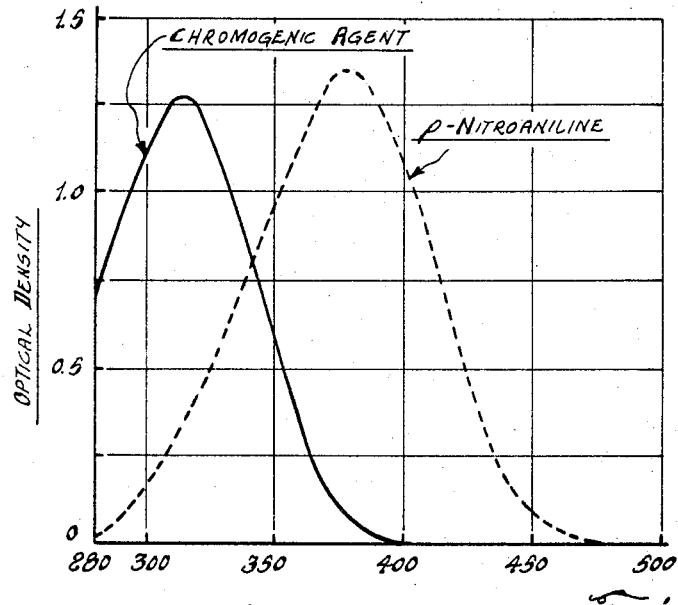
FIG. 1 is a chart showing a comparison between the absorption spectra of Nα-benzoyl arginine p-nitroanilide hydrochloride and p-nitroaniline, the latter being a product of the hydrolysis of the former.

D,L isomers of the Nα-benzoyl arginine p-nitroanilide hydrochloride was obtained in satisfactory yield by the condensation of Nα-benzoyl L-arginine and p-nitroaniline in the presence of phosphorous pentoxide with diethyl phosphate as solvent in the manner set forth in Examples 1 and 2.

EXAMPLE 1

9.1 g. of Nα-benzoyl L-arginine hydrochloride, 4 g. of p-nitroaniline and 13.6 ml. of tri-n-butylamine were dissolved in 25 ml. of diethyl phosphite and mixed with 4.1 g. of phosphorous pentoxide which had previously been dissolved in 25 ml. of diethyl phosphite by warming on a steam bath with manual stirring. The procedure set forth in this example should be carried out under a hood as phosphine is a by-product. The reaction was then heated on a steam bath for 1 hour, after which it was poured into 400 ml. of water, yielding a semi solid oil. After standing overnight in a refrigerator, the supernatant solution was decanted and the residue macerated successively in ether and 1:1 ether-petroleum ether. The solid product was then collected by filtration and crystallized from ethanol. This yielded 7.5 gms. of a product melting at 215–218°. 150 mg. of this crude material was then recrystallized from dimethylformamide-water and yielded a material having a M.P. of 247–249°. Elemental analysis indicated that this material is Nα-benzoyl, Nα-phosphoryl-DL-arginine p-nitroanilide. The rest of the crude material was suspended in 150 ml. of boiling water. Upon addition of 150 ml. of N HCl, all suspended material went into solution and precipitation of the hydrochloride followed. After 24 hours at 4°, 4.2 gms. of the product having a M.P. of 256–258° was collected by filtration. Recrystallization of the material from hot water raised the M.P. to 261–262°.

EXAMPLE 2

A suspension of 30 g. Nα-benzoyl L-arginine in 150 ml. of diethyl phosphate containing 7.35 ml. of 85% phosphoric acid was heated on a steam bath until most of the suspended particles had dissolved. The procedure set forth in this example should be carried out under a hood as phosphine is a by-product. 15 gm. of p-nitroaniline and 51.5 ml. of tri-n-butylamine were then added and the mixture was poured into a solutioin of 30.7 gm. of phosphorous pentoxide in 130 ml. of diethyl phosphite. The reaction mixture was heated on a steam bath, with stirring, for 1 hour. Diethyl phosphite was then removed in vacuo and the residual oil was added to 600 ml. of N HCl. Warming to 65° on a steam bath resulted in complete solution of the oil and the appearance of the product Nα-benzoyl arginine p-nitroanilide hydrochloride. After standing in the refrigerator for 24 hours, the product was collected and washed with cold water. This procedure yielded 40 gms. of a yellow product which was subsequently recrystallized from 20% acetic acid including treatment with charcoal. 35 gms. of a final product was obtained which had a M.P. of 260–262° and possessed a faint yellow color.

The D, L isomers of benzoyl arginine p-nitroanilide are substrates of trypsin and capable of being hydrolyzed more rapidly than benzoyl L-arginimide the classical trypsin substrate. It is generally supposed that the hydrolysis of susceptible substrates by trypsin proceeds via a three step mechanism:

$$E+S \rightarrow ES \quad (1)$$
$$ES \rightarrow ES'+P' \quad (2)$$
$$ES' \rightarrow E+P \quad (3)$$

wherein E is the enzyme and S is the substrate. Step (1) yields the Michaelis-Menten complex ES followed by the acylation of the enzyme to yield ES' and P', the latter being either an alcohol or an amine depending upon the nature of the substrate. Step (2) is a deacylation step that yields free enzyme and the free amino acid or acylated derivative. The D, L isomers may be used in systems containing as little as 1 μg. of the enzyme trypsin per ml. to give a distinguishing color reaction when hydrolyzed to yield p-nitroaniline. In this respect, it is the most sensitive amide substrate of trypsin thus far reported, the electron attracting p-nitroaniline function undoubtedly contributing to its activity. It can also be predicted that since the D isomer is a potent competitive inhibitor, the L isomer, if isolated, would be hydrolyzed at an even more rapid rate than a mixture of the D, L isomers.

A profile of the enzymic activity of trypsin was obtained by continuous measurements of free p-nitroaniline while the reaction proceeds in a Beckman DU spectrophotometric cuvette that was maintained at constant temperature. The absorption spectra of the D, L isomers at a concentration of $10^{-4}$ M of pH 8.17 are shown in FIG. 1, as well as the spectrum of p-nitroaniline determined under identical conditions. The anilides possess a maxima at 315 mμ with an extinction coefficient of 13,000, while p-nitroaniline has a maxima at 380 mμ

$$(E_{max.}=13,500)$$

the spectrum of the latter remaining unchanged between pH 5 and 10.5. As shown, the curves overlap at 380 mμ, therefore, the extent of hydrolysis was determined by measurement of p-nitroaniline at 410 mμ, at which wavelength the extinction coefficient is 8800 and no contribution to the over-all absorbance being made by the anilides. The procedure set forth in Examples 3 and 4, which follow, are two of the experimental procedures used to study the activity of trypsin.

EXAMPLE 3

2 ml. of a solution containing 3.92 mg. of a D, L isomeric mixture of Nα-benzoyl arginine p-nitroaniline hydrochloride in 0.8 ml. of 0.05 M Veronal buffer were placed in a cuvette and allowed to reach an equilibrium temperature of 15°, at which time, 0.2 ml. of a solution containing 9 ml. of the enzyme trypsin in 20 ml. of 0.001 M HCL was added to the solution in the cuvette. Readings were made at 410 mμ about every 10 or 15 seconds for approximately 5 minutes. The control contained 0.2 ml. of 0.001 N HCL in place of the enzyme. Similar experiments were performed following the above procedure and the kinetics constants were determined at inhibition concentrations of $3.0 \times 10^{-4}$ and $6.0 \times 10^{-4}$ M of the D-isomer and L-isomer concentrations of $1.0 \times 10^{-4}$, $1.5 \times 10^{-4}$, $2.0 \times 10^{-4}$, and $3.0 \times 10^{-4}$, the inhibitor solution containing 3.92 mg.. of the D isomer in 30 ml. of 0.05 M Veronal buffer pH 8.15.

EXAMPLE 4

A $10^{-3}$ M stock solution of a D, L isomeric mixture of Nα-benzoyl arginine p-nitroaniline hydrochloride was prepared in the following manner: 43.5 mg. of the D, L isomers were dissolved in 1 ml. of dimethylsulfoxide, and the solution was brought to 100 ml. with 0.05 M Tris buffer pH 8.2 containing 0.02 M $CaCl_2$. Care was taken to dissolve all of the isomeric mixture in the dimethylsulfoxide as the presence of any crystals might cause precipitation to occur on standing. Also, the temperature of this solution was never allowed to fall below 25°.

0.9 ml. of water was added to 5 ml. of the above stock solution and the mixture was allowed to equilibrate in a thermostatically controlled bath at 25° for 5 minutes.

Figure 2:
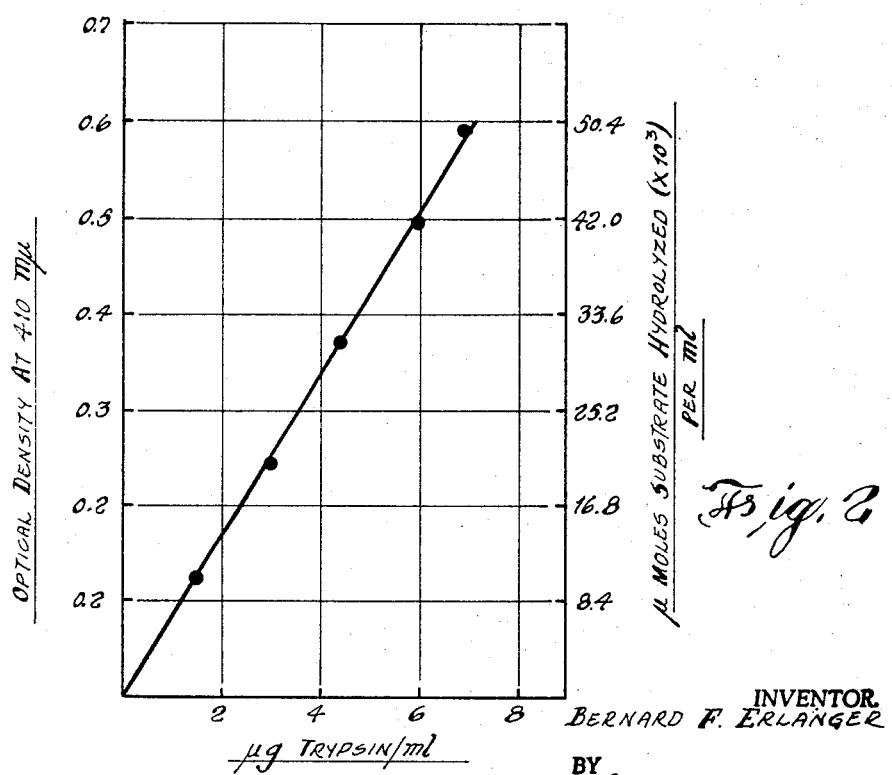
FIG. 2 is a chart showing the rate of hydrolysis of Nα-benzoyl arginine p-nitroanilide hydrochloride in the presence of the trypsin.

At zero time, 0.1 ml. of an enzyme solution containing a known amount of trypsin between 9 to 45 μg. in a 0.001 M HCL solution was added, and the reaction was allowed to run 600 seconds. In each experiment a suitable control without enzyme was also used. The addition of 1.0 ml. of 30% acetic acid terminated the reaction, and the quantity of nitroaniline was estimated spectrophotometrically at 410 mμ in a Bausch and Lomb spectronic 20 using 19×150 mm. cuvettes and the data acquired is set forth in FIG. 2 indicating that the rate of hydrolysis of a D, L isomeric mixture of Nα-benzoyl arginine p-nitroanilide hydrochloride at a concentration of $0.83 \times 10^{-3}$ M is directly proportional to the trypsin concentration over at least a five-fold range up to 7.5 μg. enzyme/ml.

It is apparent from the foregoing description that I have discovered a new chromogenic material, Nα-benzoyl arginine p-nitroanilide hydrochloride, which due to its activity and indicator-like properties, i.e. the release of color upon hydrolysis, is ideal for detection, kinetic studies and quantitative determinations of trypsin and trypsin-like enzymes in biological systems.

Obviously, many modifications and variations of the present invention will become apparent to one skilled in the art in view of the above teaching so that it is to be understood that the invention, as set forth in the appended claims, may be practiced otherwise than as described.

I claim:

1. Nα-benzoyl arginine p-nitroanilide hydrochloride.

References Cited

Chem. Abst., vol. 56, Subject Index (1–2), p. 2341 S (1962), QDI. A51.

Erlanger et al. II, Chem. Abst., vol. 56, col. 9092 (1962), QDI. A51.

Beilsteins Handbuch der Organischen Chemie. vol. 9, Supp. II, 4th Ed., p. 191, Berlin, Springer, 1949, QD 251.B4.

Fittkau et al. Chem. Abst. vol. 55, col. 10629 (1961), QDI. A51.

Tuppey et al. Hoppe Seyler's Zeit. Physiol. Chemie. vol. 329, pp. 278–88 (Nov. 15, 1962), QD 501.25.

Erlanger et al. Arch. Biochem. Biophys., vol. 95, pp. 271–8 (1961).

HENRY R. JILES, *Primary Examiner.*

N. TROUSOF, *Assistant Examiner.*